(12) United States Patent
Johnson

(10) Patent No.: US 6,348,998 B1
(45) Date of Patent: Feb. 19, 2002

(54) POLARIZATION PHASE PLATE ASSEMBLY

(75) Inventor: John L. Johnson, Heidelberg (DE)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/805,715

(22) Filed: Mar. 13, 2001

(51) Int. Cl.[7] ................................................. G02B 5/30
(52) U.S. Cl. ...................... 359/495; 359/497; 359/499; 359/501
(58) Field of Search ................................ 359/494, 495, 359/497, 498, 499, 500, 501

(56) References Cited

U.S. PATENT DOCUMENTS

| 4,500,178 A | * | 2/1985 | Yeh | 359/497 |
| 4,548,479 A | * | 10/1985 | Yeh | 359/497 |
| 4,678,287 A | * | 7/1987 | Buhrer | 359/498 |
| 4,772,104 A | * | 9/1988 | Buhrer | 359/498 |

* cited by examiner

Primary Examiner—Ricky D. Shafer
(74) Attorney, Agent, or Firm—Arthur H. Tischer; Freddie M. Bush; Hay Kyung Chang

(57) ABSTRACT

Polarization phase plate Assembly comprises at least two uniaxial crystal plates which are identical to each other in structure and dimension and a retarder plate sandwiched between the two uniaxial crystal plates. Initially the optic axes of the crystal plates are aligned to be parallel with each other. Then the plates are subsequently rotated around the normals of the plates by an equal twist angle but in opposite directions. When a beam of light is passed through the assembly post-twist, the result is high-quality fringes that are straight, smooth and capable of exhibiting close to 100% contrast. The fringes have a sinusoidal cross-fringe profile and vary in number in relation to the degree of the twist angle.

12 Claims, 4 Drawing Sheets

POLARIZATION PHASE PLATE ASSEMBLY

DEDICATORY CLAUSE

The invention described herein may be manufactured, used and licensed by or for the Government for governmental purposes without the payment to me of any royalties thereon.

BACKGROUND OF THE INVENTION

Polarization phase plates made of birefringent crystals have long been useful in the study and various applications of polarized light. However, prior art applications of these crystals, typically in sandwich-like layers, exhibited serious problems such as complex angular dependencies of the through-beam geometry for the induced polarization phase shift, little or no fringe spacing adjustment capability and, most severely, exceedingly poor performance for systems that require a large fringe-count having very fine fringe spacing. Prior art applications typically utilized very thin plates (usually less than 1 mm) having very shallow cut angles (usually less than 10°). This is due to the fact that, based on certain assumptions that are well-known in the art regarding the e-ray and o-ray components of the incoming light and the relationship between the wave vector and the power flow vector and polarization and phase-shift dynamics at the air-dielectric interface, a fairly valid analysis could be done on the beam output of a thin-plate assembly. But these assumptions do not result in accurate beam analysis for crystals that are thick enough to be practical to fabricate (between about 1 mm and 1 cm thick) and have significant cut angles. A device is desired that uses such thick crystals and can produce a large count, yet high-quality fringes that are straight, smooth and have a sinusoidal cross-fringe profile and as much as 100% contrast when the input beam is fully linearly polarized and oriented for maximum contrast.

SUMMARY OF THE INVENTION

Applicant's invention is a polarization phase plate assembly (hereinafter referred to as "the Assembly") comprising at least two uniaxial crystal plates which are identical to each other in structure and dimension and a retarder plate sandwiched between the two crystal plates. Initially the optic axes of the crystal plates are aligned to be parallel with each other. Then the crystal plates are rotated around their normals by an equal twist angle but in opposite directions. When a beam of light is passed through the Assembly, the result is high-quality fringes that vary in number in relation to the degree of the twist angle.

DESCRIPTION OF THE PREFERRED EMBODIMENT

Figure 1:
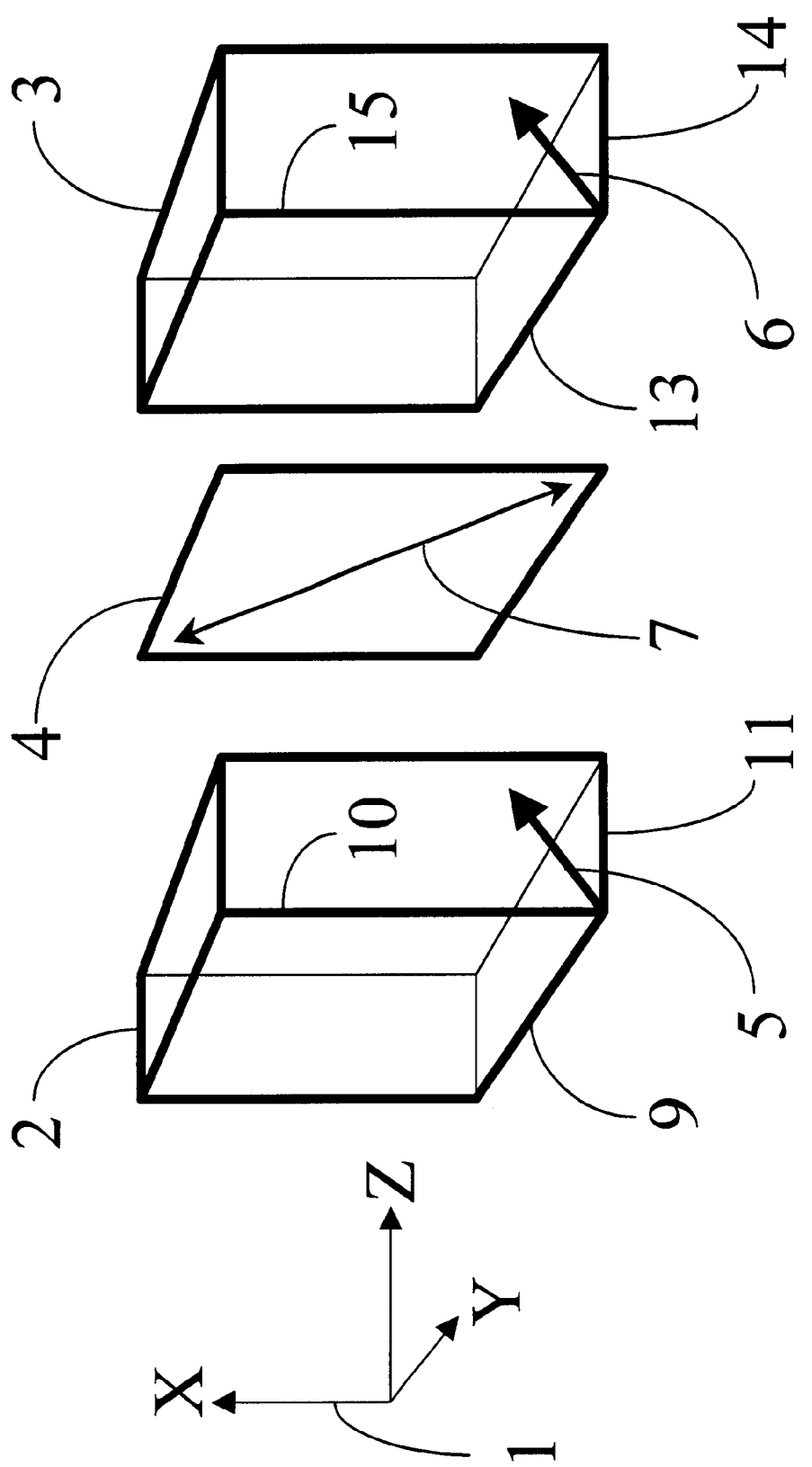
FIG. 1 is an exploded view of the Assembly before the twist.

The structure and operation of the Assembly is explained hereinbelow with reference to the drawing wherein like numbers represent like parts in each of the several figures and the figures illustrate the geometry of the Assembly with reference to the standard right-handed orthonormal Cartesian coordinate system labeled 1.

FIG. 1 shows an exploded view of the Assembly comprising first uniaxial crystal plate 2, second uniaxial crystal plate 3 and retarder plate 4 positioned between the two uniaxial crystal plates. The two crystal plates are identical to each other in structure and dimension and have identically-positioned optic axis in each of them. Initially, optic axes 5 and 6 of the first and second crystal plates, respectively, are in the x-z plane and are aligned to be parallel with each other while the edges of the plates are aligned with the axes of the coordinate system: edges 9 and 13 align with the y-axis, edges 11 and 14 align with z-axis and edges 10 and 15 align with the x-axis.

It is well known that the uniaxial crystal is a material in which the refractive index ellipsoid is symmetric in two of its three dimensions and can be fully described mathematically by only two refractive indices. The optic axis of the uniaxial crystal is the direction of the index ellipsoid's unequal axis and determines what happens to the incident beam's polarization as the beam goes through the crystal. In their initial alignment, optic axes 5 and 6 make the same optic axis cut angle with the surface of their respective plates. In FIG. 1, the optic axis cut angle is shown to be 45°. But this is for illustrative purposes only; the optic axis cut angle can be any angle desired, not just 45°.

Fast axis 7 of retarder plate 4 is set in the x-y plane and makes an angle of 45° with the x-z plane. The retarder is a half-wave retarder and may be susceptible to a single wavelength, a pre-selected bandpass of wavelengths or achromatic, depending on the requirements of the Assembly user. For ease of fabrication, plates 2 and 3 have a pre-determined thickness ranging between 1 mm and 1 cm.

Figure 2:
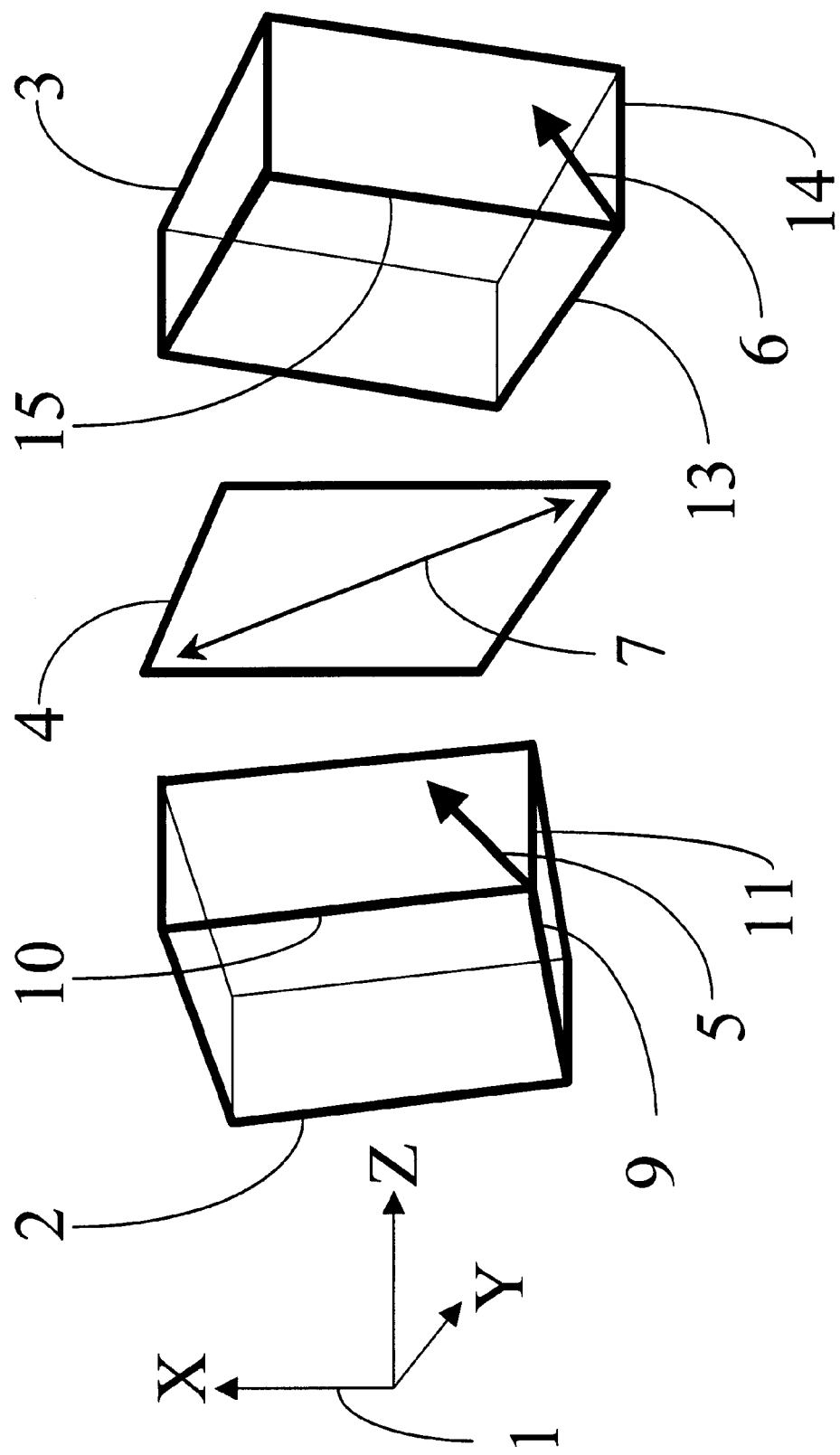
FIG. 2 is an exploded view of the Assembly after the twist.

From the initial alignment, plates 2 and 3 are rotated around the plate normals (i.e. z-axis) by an equal twist angle θ but in opposite directions. The angle θ is determined by measurement of the desired fringe spacing. Once rotated, the plates and the retarder may be permanently cemented together in the rotated position or may be mounted on a mechanical fixture so as to allow variation in the twist angle from time to time to accommodate different applications. FIG. 2 illustrates an after-twist position of the plates and the retarder. It is noted that the retarder remains fixed in its original orientation as the plates are rotated.

When light passes through the Assembly at an angle of incidence, a fringe pattern is created that is comprised of uniform, "high-quality" parallel fringe lines superimposed across the field of view. These are deemed to be "high-quality" fringes because they are straight, smooth, have a sinusoidal cross-fringe profile and capable of exhibiting close to 100% contrast when the incident beam is fully linearly polarized and oriented for maximum contrast. The spacing between the fringes is inversely proportional to the twist angle (i.e. the number of fringe lines increases as the twist angle is increased) and directly proportional to the thickness of the uniaxial crystal plates. The Assembly illustrated in FIGS. 1 and 2 is capable of producing high-quality fringes with a fringe-to-fringe angular spacing of approximately two milliradians. Some of the advantages of producing such high-quality fringes include: ability to reliably compute from the sinusoidal profile the encoded angle of incidence of the input beam, the smoothness and straightness of the fringes ensuring that the calculation is very nearly independent of the cross-sectional area of the input beam while the high-contrast fringes assures the highest achievable accuracy of the calculation and the ability to reliably relate angle-of-incidence calculations of two different beams coming through the Assembly at two different angles of incidence.

Using a filter either in front of the first plate or behind the second plate can further enhance the performance of the Assembly by limiting the spectral bandpass of the light transmitted through the Assembly and allowing the fringes generated within the spectral bandpass to be visible over an accordingly larger field of view. Since the fringe period varies directly with the wavelength of the incident light, the fringes resulting from different wavelengths will superimpose at different spatial phases across the field of view and cause the overall fringe visibility to lessen at large viewing angles. By restricting the wavelengths with a spectral filter, this "washout" can easily be minimized with the result that the fringe pattern retains a high contrast ratio over the field of view.

The polarization state of the incident beam before it enters the Assembly determines the starting location of the fringe peaks with respect to the perpendicular point of the angle of incidence. For example, if the incident beam is linearly polarized, the fringe pattern will be offset in the cross-fringe direction exactly one-half of a fringe cycle (one light and one dark line) than if the incident beam is circularly polarized. The Assembly is capable of generating polarization fringes having a linear, one-dimensional variation of the relative polarization phase shift with the angle of incidence for thick crystals with large cut angles. The induced polarization phase shift is well approximated by $$\Psi = K \frac{4\pi d \Delta n}{\lambda n} \theta_{TWIST} \theta_{FOV},$$

where $\Psi$ is the polarization phase shift between the e-ray and the o-ray, d is the thickness of each of the uniaxial plates, $\lambda$ is the wavelength of the incoming light, $$\frac{\Delta n}{n}$$

is the relative birefringence of the plates, $\theta_{TWIST}$ is the relative twist angle as illustrated in FIG. 2 and $\theta_{FOV}$ is the angular cross-fringe direction of the Assembly (i.e. the direction across the fringes in the resulting fringe image) and K is a proportionality coefficient. The polarization phase shift can determine the exact degree of ellipticity of the incoming light which, in turn, is a function of the characteristics of the reflecting/emitting surface being viewed and of the specific angular orientation of that surface. If one rotates the Assembly around the line of sight, one sees the fringe pattern go through a point of maximum contrast. The line-of-sight rotation angle at which this occurs indicates the angle of the semi-major axis of the incoming polarization state. When this information is used in conjunction with the maximum contrast ratio, the ellipticity angle and the total intensity of the incoming light, all four components of the Stokes vector of the incoming light can be found. The Stokes vector is a complete description of the polarization state of light.

The Assembly is rendered more versatile by having variable twist angles. This can be accomplished by mounting uniaxial plates 2 and 3 and retarder 4 so as to allow the plates to be rotated by any equal and opposite angles around the plate normals while the retarder is maintained fixed in place.

Figure 3:
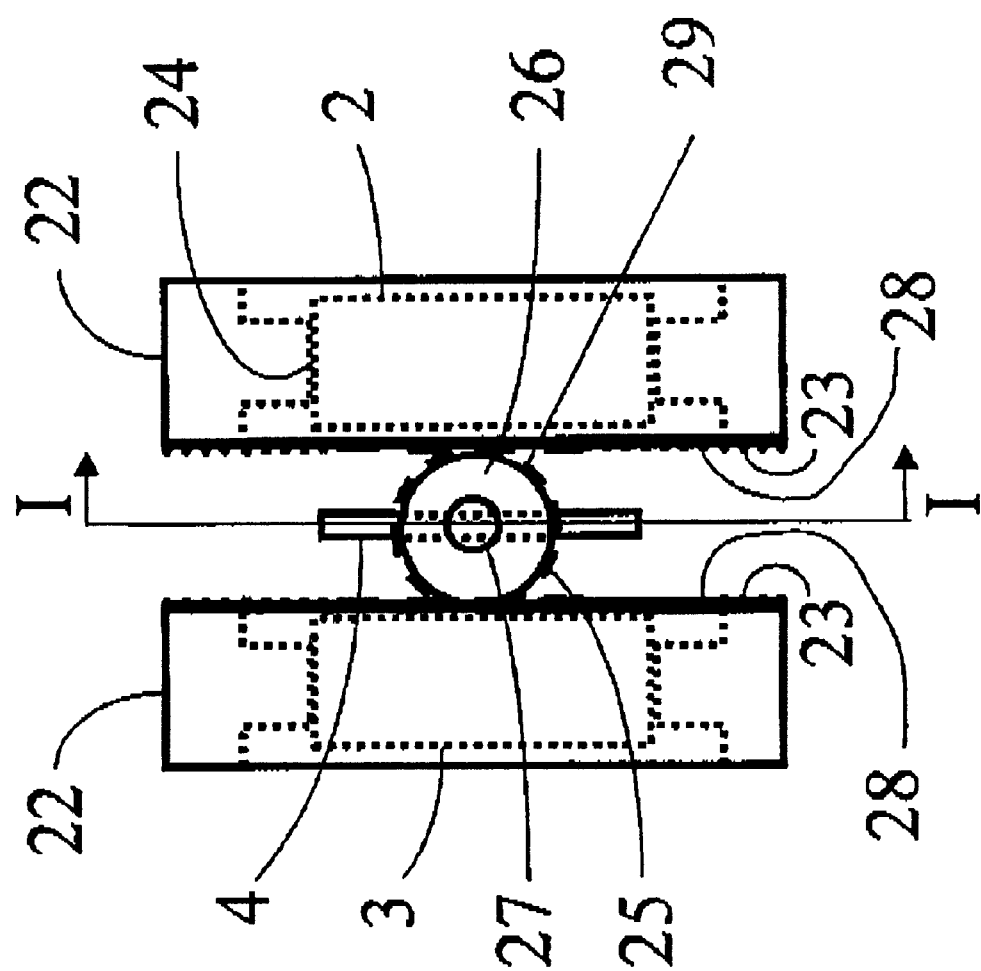
FIG. 3 shows a side view of the Assembly mounted to have variable twist angle, the broken lines representing features that are hidden from view.
Figure 4:
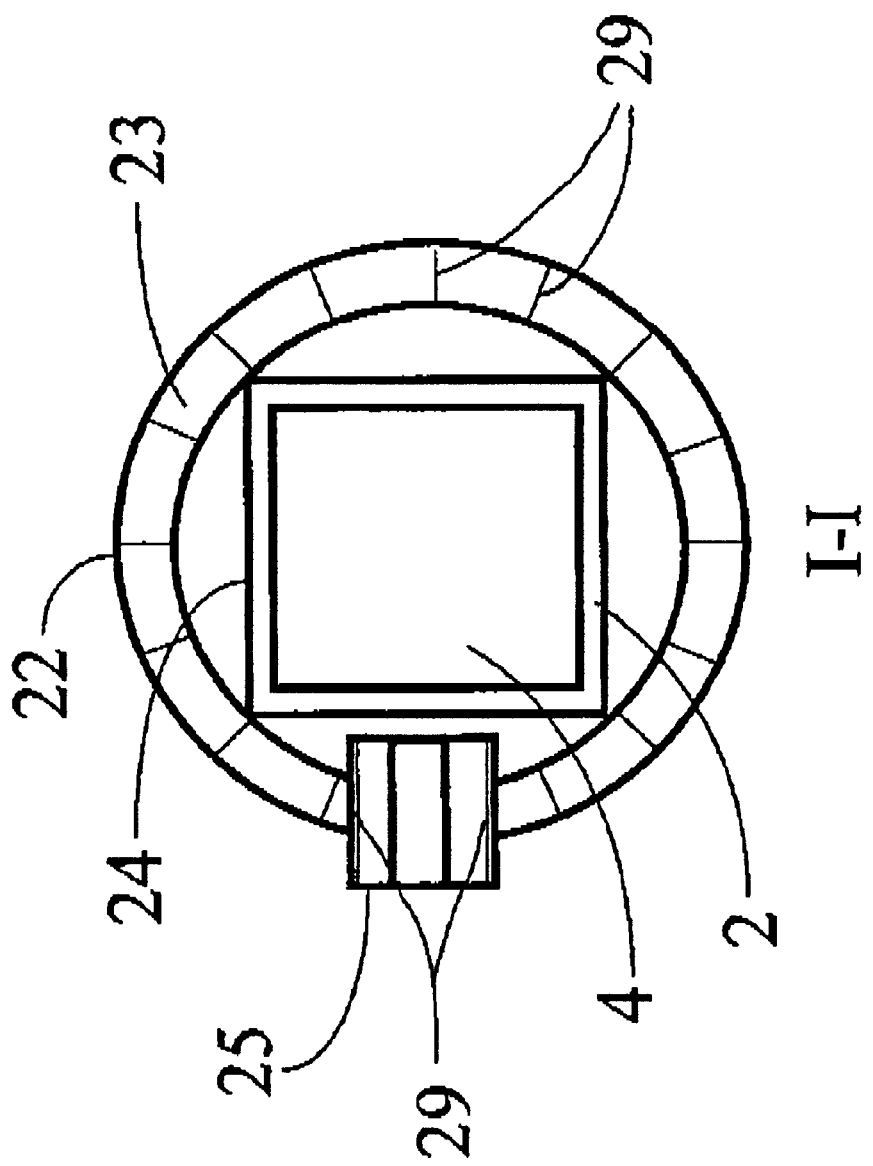
FIG. 4 shows a frontal view of the Assembly mounted to have variable twist angle.

As illustrated in FIGS. 3 and 4, each of the plates is fitted into aperture 24 of frame 22. The frame has first contact surface 23 which may be comprised of gear tooth grooves 28 or a friction surface. First contact surface 23 is in touch with second contact surface 25 on roller 26. Second contact surface 25 has a corresponding gear tooth 29 or friction surface suitable for engaging with first contact surface 23 so that a rotation of roller 26 causes equal and opposite rotations of mounts 22. Roller 26 turns on shaft 27 that is fixed to a support platform (not shown) that also supports non-rotating retarder plate 4.

The polarization phase plate assembly, as described above, may be useful in many applications. One is polarization scene encoding by degree of fringe contrast and ellipticity shift; by measuring the fringe contrast and the cross-fringe shift of the fringe pattern, one can infer what kind of polarization came from the objects at that point in the image. Another application is angular position measurement in which only a single beam is allowed to pass through the Assembly: for example, light from a star. The Assembly can measure to a very fine degree the location of a point source, such as the star, in an image, well within a small fraction of the area of a single pixel. The Assembly does so by inducing a polarization phase shift to the beam, one that is related to the cross-fringe angle of incidence. Then using suitable analyzing elements, the two polarization components of the beam can be separated out and the intensity of each component measured. Their difference divided by their sum is directly related to the polarization phase shift referred to above and thus to the cross-fringe angle of incidence.

Although a particular embodiment and form of this invention has been illustrated, it is apparent that various modifications and embodiments of the invention may be made by those skilled in the art without departing from the scope and spirit of the foregoing disclosure. One such modification is using additional uniaxial plates and retarders to make an extended set of layers of alternating uniaxial plates and retarders with the principal planes and fast axes further rotated by additional or lesser amounts around the plate normals (i.e. z-axis). Accordingly, the scope of the invention should be limited only by the claims appended hereto.

I claim:

1. A polarization phase plate assembly for producing, in response to incoming light, fringes having a sinusoidal cross-fringe profile and as much as 100% contrast, said assembly comprising: at least a first and a second uniaxial crystal plates, said crystal plates having an identical predetermined thickness and each of said crystal plates having an identically-positioned optic axis therein at a predetermined cut angle; and a half-wave retarder sandwiched between said first and second plates, said first and second plates being initially arranged so as to align the optic axes of said plates to be parallel to each other but subsequently being rotated by a pre-selected twist angle θ but in opposite directions around the normals of said plates, thereby yielding high-quality fringes, said fringes being representative of polarization phase shift between the e-ray and the o-ray components of the incoming light and the polarization phase shift, in turn, being a function of the angle of incidence and initial polarization state of the incoming light incident on said assembly.

2. A polarization phase plate assembly for producing, in response to incoming light, fringes having a sinusoidal cross-fringe profile and as much as 100% contrast as set forth in claim 1, wherein said first and second uniaxial crystal plates are identical to each other in their structure and dimension.

3. A polarization phase plate assembly for producing high-quality fringes in response to incoming light as set forth in claim 2, wherein said first and second crystal plates comprise any suitable optical uniaxial material.

4. A polarization phase plate assembly as set forth in claim 3, wherein said first and second crystal plates comprise calcite.

5. A polarization phase plate assembly as set forth in claim 4, wherein each of said plates has a 45-degree optic axis cut angle.

6. A polarization phase plate assembly as set forth in claim 5, wherein said pre-determined thickness of each of said plates ranges from about 1 mm to about 1 cm.

7. A polarization phase plate assembly as set forth in claim 6, wherein said retarder may be achromatic or be susceptible to a single wavelength or a bandpass of wavelengths.

8. A polarization phase plate assembly for producing high-quality fringes from incoming light, said assembly comprising: a first and a second uniaxial crystal plates, each having an identical pre-determined thickness and an identically-positioned optic axis therein; a retarder sandwiched between said first and second plates, said first and second plates being initially arranged so as to align the optic axes of said plates to be parallel to each other, said plates further being mounted to be rotatable by an equal variable twist angle $\theta$ but in opposite directions around the normals of said plates, thereby yielding high-quality fringes, said fringes varying in number relative to said varying twist angle $\theta$ and said fringes being representative of polarization phase shift between the e-ray and the o-ray components of the incoming light and the polarization phase shift, in turn, corresponding to the angle of incidence of the incoming light incident on said assembly; and a means for rotating said plates while said retarder remains fixed in place.

9. A polarization phase plate assembly for producing high-quality fringes as described in claim 8, wherein rotating means comprises: a rotatable first frame, said first frame having a first aperture for securing said first plate therein; a rotatable second frame, said second frame having a second aperture for securing said second plate therein; a roller, said roller being coupled between said frames; a means to rotate said roller, said rotation of said roller causing said frames to rotate around the plate normals by an equal degree of displacement but in opposite directions relative to each other.

10. A polarization phase plate assembly as described in claim 9, wherein said frames each has thereon a contact surface to contact said roller, said contact surface having thereon gear tooth grooves.

11. A polarization phase plate assembly as described in claim 10, wherein said roller has corresponding gear tooth grooves suitable for engaging with said gear tooth grooves of said frame contact surfaces.

12. A polarization phase plate assembly as described in claim 11, herein said means to rotate said roller comprises: a fixed shaft, on which said roller is mounted.

* * * * *